United States Patent
Oh et al.

(10) Patent No.: US 9,921,711 B2
(45) Date of Patent: Mar. 20, 2018

(54) AUTOMATICALLY EXPANDING PANES

(71) Applicant: Samsung Electronics Co. Ltd., Suwon-si, Gyeonggi-do (KR)

(72) Inventors: Baeksan Oh, Bridgewater, NJ (US); William James Confer, Clinton, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 13/826,251

(22) Filed: Mar. 14, 2013

(65) Prior Publication Data
US 2014/0282232 A1    Sep. 18, 2014

(51) Int. Cl.
| G06F 3/048 | (2013.01) |
| G06F 3/0481 | (2013.01) |
| G06F 3/0488 | (2013.01) |
| G06F 3/0485 | (2013.01) |

(52) U.S. Cl.
CPC .......... *G06F 3/0481* (2013.01); *G06F 3/0485* (2013.01); *G06F 3/0488* (2013.01); *G06F 3/04812* (2013.01); *G06F 2203/04803* (2013.01)

(58) Field of Classification Search
CPC .................................................... G06F 3/0481
USPC ........................................ 715/800, 801, 864
See application file for complete search history.

(56) References Cited

U.S. PATENT DOCUMENTS

| 5,712,995 A * | 1/1998 | Cohn ............................ 715/792 |
| 5,920,315 A | 7/1999 | Santos-Gomez |
| 6,195,094 B1 | 2/2001 | Celebiler |
| 2006/0022955 A1 | 2/2006 | Kennedy |
| 2007/0005670 A1 | 1/2007 | Pennington, II et al. |
| 2007/0075980 A1 | 4/2007 | Hsieh et al. |
| 2008/0055269 A1* | 3/2008 | Lemay .................. G06F 3/0482 345/173 |
| 2008/0284756 A1 | 11/2008 | Hsu et al. |
| 2009/0063972 A1* | 3/2009 | Ma .......................... G06F 3/048 715/716 |
| 2009/0172562 A1 | 7/2009 | Lai |
| 2010/0073305 A1 | 3/2010 | Zawacki et al. |
| 2010/0175023 A1 | 7/2010 | Gatlin et al. |
| 2010/0231612 A1* | 9/2010 | Chaudhri et al. ............. 345/684 |
| 2011/0012930 A1 | 1/2011 | Davis et al. |
| 2011/0055752 A1 | 3/2011 | Rubinstein et al. |
| 2011/0055773 A1 | 3/2011 | Agarawala et al. |

(Continued)

FOREIGN PATENT DOCUMENTS

| CN | 101339488 A | 1/2009 |
| CN | 101515226 A | 8/2009 |
| CN | 102929520 A | 2/2013 |

*Primary Examiner* — Jeffrey A Gaffin
*Assistant Examiner* — Mohamed Abou El Seoud
(74) *Attorney, Agent, or Firm* — Jefferson IP Law, LLP (57) ABSTRACT

A portable electronic device and a method for automatically resizing a plurality of dynamically sizable panes displaying information on a screen of a portable electronic device are provided. The method includes displaying the information in the plurality of dynamically sizable panes on the screen of the portable electronic device, interacting with one of the plurality of dynamically sizable panes, and automatically resizing all of the plurality of dynamically sizable panes according to the interaction with the one of the plurality of dynamically sizable panes.

34 Claims, 7 Drawing Sheets

(56) References Cited

U.S. PATENT DOCUMENTS

| | | |
|---|---|---|
| 2011/0105187 A1* | 5/2011 | Dobroth .............. G06F 3/0481 455/566 |
| 2011/0145759 A1 | 6/2011 | Leffert et al. |
| 2011/0157234 A1 | 6/2011 | Lainer |
| 2011/0181527 A1 | 7/2011 | Capela et al. |
| 2011/0185317 A1 | 7/2011 | Thimbleby et al. |
| 2012/0023410 A1 | 1/2012 | Roth et al. |
| 2013/0038544 A1 | 2/2013 | Park |

* cited by examiner

AUTOMATICALLY EXPANDING PANES

BACKGROUND OF THE INVENTION

1. Field of the Invention

The present invention relates to a method which automatically expands and contracts panes displayed on a screen of a portable electronic device. More particularly, the present invention relates to a method which automatically expands and contracts panes displayed on a screen of a portable electronic device according to a user's interaction with the displayed panes.

2. Description of the Related Art

The use of portable electronic devices such as for example, mobile telephones, tablet computers, electronic book readers, consumer electronics, personal digital assistants and the like to search for and manage content either stored in the electronic devices or searched for from remote locations, such as the Internet, intranet, and the like has increased significantly in recent years. Many of these portable electronic devices include touch-sensitive surfaces as input devices. Therefore, to search for and manage the content displayed on a screen of the portable electronic device, a user needs to input a command on the portable electronic device. The command is usually input through a user touching the touch-sensitive surface. This is usually done by either touching the touch-sensitive surface of the portable electronic device with the user's finger or through an object such as for example a stylus or pen. In addition, a layout of the panes or windows displayed on the screen of the portable electronic device allows the user to search for and manage the displayed content which is either stored in the portable electronic device or searched for from external locations, such as for example the Internet.

Many applications for searching and managing displayed content on a portable electronic device layout an interface with a plurality of panes or windows. One example of such interfaces is a two "pane" interface, in which one pane provides content based on the interaction with the other pane. A particular example of such pane layout is a scrollable list of email subjects next to the currently selected email and a month-view calendar above a scrollable list of appointments for the selected day. With such interfaces, one pane usually dominates or occupies most of the area of the screen of the electronic device while the other pane occupies a smaller area of the screen of the electronic device and thus the smaller pane appears compressed and is not as pleasant to interact with as the larger pane.

Accordingly, methods have been provided to address these issues. For example, in larger electronic devices, such as desktop computers, particular methods are provided which allow the user of the desktop computer to manually drag edges or corners of the displayed pane in order to adjust the panes size. However, this process is cumbersome and cannot be easily adapted to portable electronic devices. Furthermore, desktop computers employ hidden panes that appear upon moving a cursor controlled by a pointing device such as a mouse. However, this process is also inapplicable to portable electronic devices, because portable electronic devices do not utilize a cursor to navigate the content displayed on the screen.

Instead, in portable electronic devices, a user's finger, a stylus and the like, are used to touch the screen and interact with the contents displayed thereon. Therefore, existing methods for managing the size of the panes displayed on the screen of portable electronic devices are cumbersome and inefficient.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method which automatically expands and contracts panes displayed on a screen of a portable electronic device according to a user's interaction with the displayed panes.

In accordance with an aspect of the present invention, a method for automatically resizing a plurality of dynamically sizable panes displaying information on a screen of a portable electronic device is provided. The method includes displaying the information in the plurality of dynamically sizable panes on the screen of the portable electronic device, interacting with one of the plurality of dynamically sizable panes, and automatically resizing all of the plurality of dynamically sizable panes according to the interaction with the one of the plurality of dynamically sizable panes.

In accordance with another aspect of the present invention, there is a method for resizing a plurality of panes arranged on a screen of a portable electronic device is provided. The method includes displaying information in the plurality of panes arranged on the screen of the portable electronic device, interacting with one of the plurality of panes, and automatically resizing all of the plurality of panes in response to the interaction with the one of the plurality of panes.

In accordance with yet another aspect of the present invention, a method for resizing a plurality of windows arranged on a screen of a portable electronic device is provided. The method includes displaying information in the plurality of windows arranged on the screen of the portable electronic device, interacting with one of the plurality of windows, automatically resizing all of the plurality of windows arranged on the screen of the portable electronic device in response to the interacting with the one of the plurality of windows, terminating the interaction with the one of the plurality of windows, and automatically resizing all of the plurality of windows arranged on the screen of the portable electronic device in response to the terminating of the interaction with the one of the plurality of windows.

In accordance with still another aspect of the present invention, a portable electronic device is provided. The portable electronic device includes a touchscreen and a controller. The touchscreen includes a display and an input unit. The controller controls the touchscreen to display information in a plurality of dynamically sizable panes, based on input to the touchscreen, detects an interaction with one of the plurality of dynamically sizable panes, and automatically resizes all of the plurality of dynamically sizable panes according to the detection of the interaction with the one of the plurality of dynamically sizable panes.

In accordance with a further aspect of the present invention, a portable electronic device is provided. The portable electronic device includes a touchscreen and a controller. The touchscreen includes a display and an input unit. The controller controls the touchscreen to display information in a plurality of panes, based on input to the touchscreen, detects an interaction with one of the plurality of panes, and automatically resizes all of the plurality of panes in response to the detection of the interaction with the one of the plurality of panes.

In accordance with still a further aspect of the present invention, a portable electronic device is provided. The portable electronic device includes a touchscreen and a controller. The touchscreen includes a display and an input unit. The controller controls the touchscreen to display information in the plurality of windows, based on input to the touchscreen, detects an interaction with one of the plurality of windows, automatically resizes all of the plurality of windows in response to the detection of the interaction with the one of the plurality of windows, detects termination of the interaction with the one of the plurality of windows, and automatically resizes all of the plurality of windows in response to a detection of the termination of the interaction with the one of the plurality of windows.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Furthermore, FIGS. 1A though 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged portable electronic device. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIGS. 1A through 1F illustrate a process for automatically resizing panes displayed on a screen of a portable electronic device according to an exemplary embodiment of the present invention.

Particularly, according to an exemplary embodiment of the present invention, there is provided an interface and method which provide a plurality of panes or windows displayed on the screen of a portable electronic device, where each pane or window is always visible on the screen of the portable electronic device and the plurality of displayed panes are automatically resized. That is, the plurality of displayed panes automatically expand and/or contract, to improve usability of the panes while maintaining the context and visibility of the plurality of displayed panes.

For example, FIGS. 1A through 1F illustrate a process for automatically resizing two panes displayed on a screen of a portable electronic apparatus. Although the described process for resizing the panes includes actions such as tapping on the screen or swiping an object across the screen, as described below, such interactions are exemplary and other types of interactions may be used to resize the panes. Also, the method of resizing two panes displayed on the screen of the portable electronic device as illustrated in FIGS. 1A through 1F is merely an exemplary embodiment, and the method may include resizing more than two panes displayed on the screen of the portable electronic apparatus or resizing panes displayed on a screen of any electronic device.

Figure 1A:
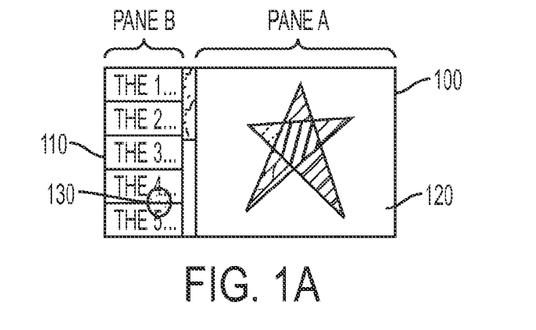
FIGS. 1A through 1F illustrate a process for automatically resizing panes displayed on a screen of a portable electronic device according to an exemplary embodiment of the present invention.

Particularly FIG. 1A illustrates an exemplary embodiment of a method for automatically resizing two panes, Pane A and Pane B, displayed on a screen 100 of a portable electronic device. However, it is noted that the aspects of the present invention are not limited to portable electronic devices and thus the aspects of the present invention can be adapted to any other suitable electronic device having a touch screen. As illustrated in FIG. 1A, the panes are arranged or disposed side by side or arranged next to each other with respect to a horizontal direction. However, it is noted that the panes can be differently arranged. For example, the panes can be arranged vertically, that is one pane can be located above the other pane. It is also noted that although FIG. 1A illustrates only two panes, this is merely an exemplary embodiment of the present invention and more than two panes can be displayed on the screen of the portable electronic device and differently arranged on the screen 100 of the portable electronic device. Further, it is understood that more than two panes can be automatically resized.

The small pane or Pane B contains a scrollable list 110 and the large pane or Pane A shows content 120 related to a last selected item on the scrollable list 110 of Pane B. However, this is merely an exemplary embodiment of the present invention and the panes do not necessarily have to show data related to the last selected item on the scrollable list.

When a user of the portable electronic device contacts a particular area 130 of the scrollable list 110 of Pane B, such as in the form of a scrolling motion, the panes, Pane A and Pane B, automatically resize. The contact can be in the form of a user touching the screen 100 of the portable electronic device at the particular area 130 of the scrollable list 110 with his/her finger or can be in the form of the user of the device touching the screen 100 at the particular area 130 of the scrollable list 110 with a pen or stylus. However, it is noted that these are merely exemplary embodiments of the present invention and other forms of contacting the screen 100 and of scrolling through the scrollable list 110 can be utilized.

Figure 1B:
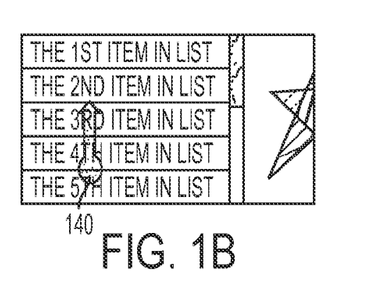

As illustrated in FIG. 1B upon the user beginning to scroll or swipe in operation 140 the scrollable list 110, the small Pane B illustrated in FIG. 1A is automatically resized. In the instant case, as illustrated in FIG. 1B, Pane B expands to more clearly show the contents of the scrollable list 110 while Pane A automatically contracts. Further, the expansion of the pane as noted in this exemplary embodiment differs from an expansion along the lines of the related art in which the user of the portable electronic device drags an edge of the pane to adjust size of the panes. If such were the case, such expansion of the pane would be a manual expansion and not an automatic expansion or resizing of the pane as in this exemplary embodiment of the present invention. Further, it is noted that although in the description of this exemplary embodiment it is stated that the panes are automatically resized upon the user beginning to scroll or swipe in operation 140 the scrollable list 110, this is merely an exemplary embodiment and the automatic resizing of the panes can occur at other times. For example, the panes could be automatically resized as soon as the user touches one of the panes or when the user makes contact with one of the ends of the panes or at any other times obvious to one of ordinary skill in the art.

Accordingly, as illustrated in FIG. 1B, Pane A moves partially off the screen 100, or away from Pane B, and Pane B automatically expands to occupy the space left by Pane A. This automatic expansion of Pane B provides a larger viewing area for the displayed contents or data, thus improving readability of the displayed contents, and in particular of the scrollable list 110. Therefore, by automatically expanding the pane currently being used, the user's experience with the portable electronic device is enhanced. It is noted that the pane expansion illustrated in this exemplary embodiment, particularly the expansion of Pane B, differs from conventional methods and systems in which only a clicked or selected item is magnified. That is, according to an exemplary embodiment of the present application, one of the panes is entirely expanded while the other pane is entirely contracted. However, this is merely an exemplary embodiment and more than one pane can be expanded and more than one pane can be contracted according to the number of panes displayed on the screen of the portable electronic device and according to a user's preference.

Figure 1C:
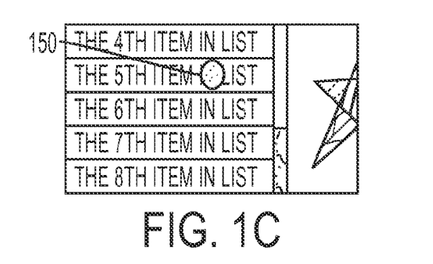
Figure 1D:
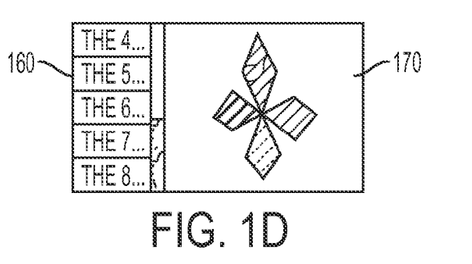
Figure 1E:
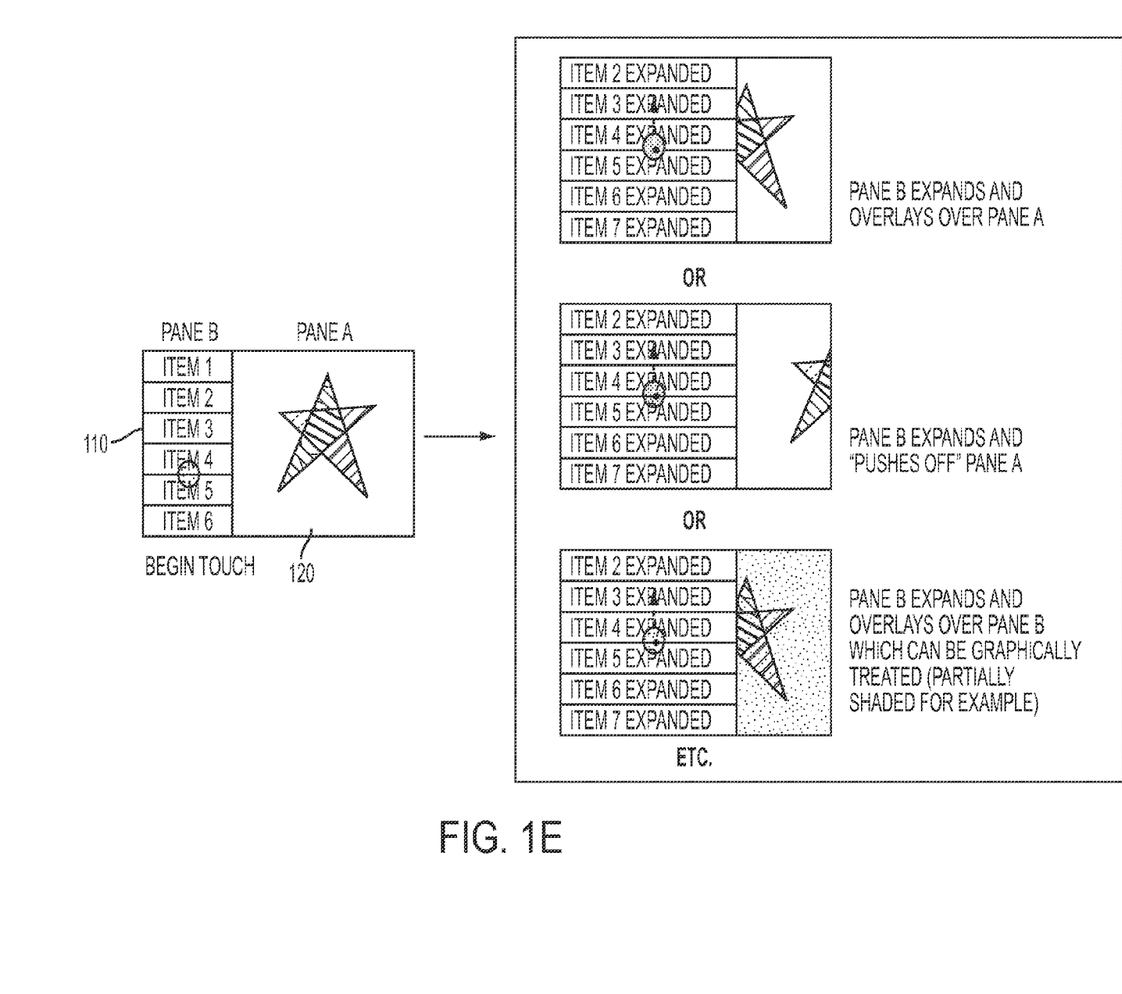
Figure 1F:
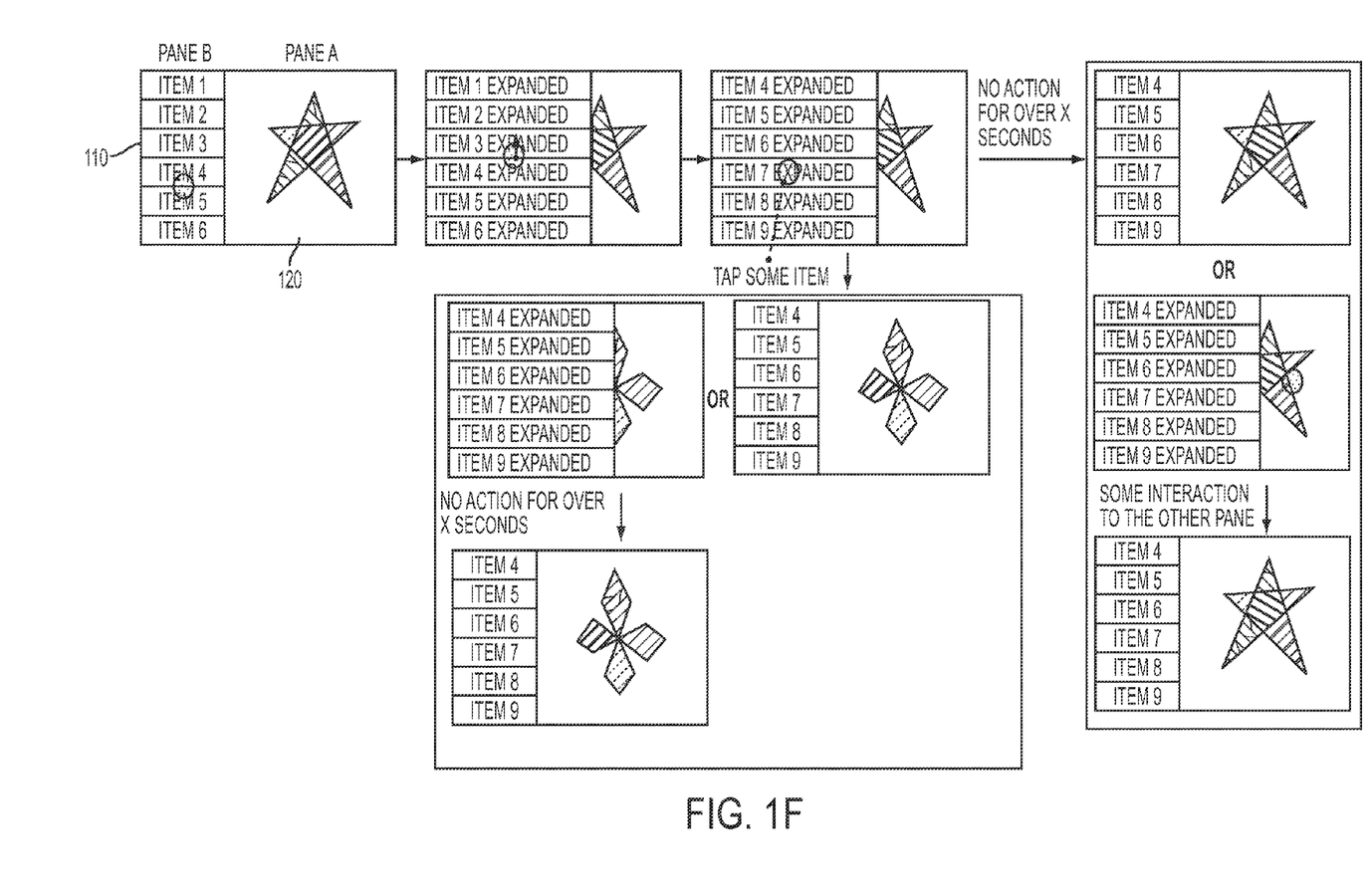

Once a user performs an action 150 such as for example clicking on a selected item displayed on the scrollable list 110, as illustrated in FIG. 1C, the expanded Pane B automatically contracts to its original size, as illustrated in FIG. 1D. That is, Pane B contracts to its original size while Pane A expands back to its original size. Further, the content displayed on one or both panes changes to reflect the last selected function. For example, as illustrated in FIG. 1C, the user selects a fifth item on the scrollable list 110 displayed on Pane B, and Pane A displays content related to the selected item. Therefore, after the user has performed the predetermined function, Pane B returns to its original size and displays content 160 related to the last user selected function. Similarly, Pane A returns to its original size but displays content 170 related to the last selected option opted in page B. However, this is merely an exemplary embodiment of the present invention and the displayed contents 160 and 170 can vary. For example, if the user simply scrolled through the scrollable list 110 but did not click or select a specific item on the scrollable list 110, the panes could be automatically resized to their original sizes without changing the originally displayed content. In other words, panes A and B could simply display the original scrollable list 110 and the content 120. It is also noted that although FIGS. 1A-1C illustrate Pane B expanding and shifting or "pushing off" Pane A, or Pane A contracting, the aspects of the present invention are not limited thereto and various other forms of expansion and contraction can occur. For example, Pane B can be expanded to overlay Pane A or Pane B can be expanded to overlay Pane A and Pane A can be shaded as illustrated in FIG. 1E. Similarly, it is noted that the processes for contracting the expanded Pane B to its original size and expanding the contracted Pane A to its original size, can also vary. For example, in one embodiment, the Panes can be resized to their original sizes upon tapping some item on the scrollable list 110 or by performing no action on the panes for a predetermined period of time or a combination of both as illustrated in FIG. 1F.

Figure 2A:
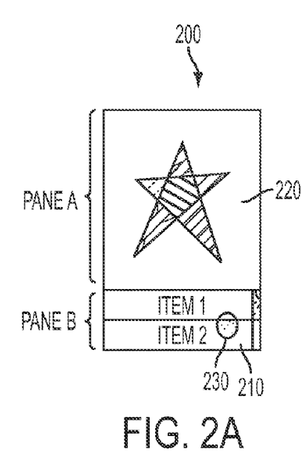
FIGS. 2A though 2E illustrate a process for automatically resizing panes displayed on a screen of a portable electronic device according to another exemplary embodiment of the present invention.

FIGS. 2A though 2E illustrate a process for automatically resizing panes displayed on a screen of a portable electronic device according to another exemplary embodiment of the present invention Particularly, FIGS. 2A through 2E illustrate the process for automatically resizing two panes disposed one on top of the other, or arranged one next to the other in a vertical direction and displayed on a screen 200 of a portable electronic device.

Particularly, FIG. 2A illustrates a smaller pane, Pane B, arranged at the bottom of the screen 200 of the portable electronic device and a larger pane, Pane A, arranged above Pane B. In the instant case, Pane A displays contents related to the contents displayed in Pane B. However, this is merely an exemplary embodiment and the panes may display contents not directly related to each other. For example, if a user of the portable electronic device scrolled through a scrollable list 210 and selected a particular item in the scrollable list 210, Pane A would display contents 220 directly related to the last selected item on the scrollable list 210. Alternatively, while the user scrolls through the scrollable list 210 displayed in Pane B, Pane A could continue to display the original content or continuously change the items displayed on the pane according to a scrolling motion on the scrollable list 210.

Similarly to the description of FIG. 1B, a user of the portable electronic device contacts or touches an area 230 of the scrollable list 210 of Pane B to initiate a function, such as for example scrolling through the scrollable list 210. The initial contact at the area 230 can be in the form of a user touching the screen 200 of the portable electronic device using his/her finger or can be in the form of the user of the device touching the screen with a pen or stylus. As also noted above, with respect to FIGS. 1A through 1F, the contacting of the screen 200 with the user's finger or a stylus are merely exemplary embodiments and thus contacting the screen 200 can be done through other means or items.

Figure 2B:
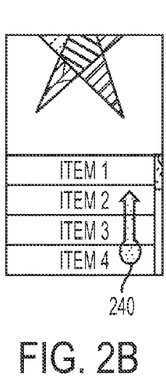

Once the user contacts the area 230 of the scrollable list 210, as illustrated in FIG. 2B the user begins to scroll or swipe through the scrollable list 210 according to a scrolling/swiping motion 240, and in response to this motion, the small Pane B illustrated in FIG. 2A is automatically resized. In the instant case, as illustrated in FIG. 2B, Pane B expands to more clearly show the contents of the scrollable list 210, while Pane A automatically contracts. However, as also discussed above, the content shown in each of the panes can vary, as well as how the panes expand and contract. For example, as discussed above with respect to FIG. 1E, when pane B expands, Pane B can overlay pane A, "push off" Pane A or create a shadow over Pane A. However, it is noted that these are merely exemplary embodiments of the present invention and the expansion and contraction of the Panes can be done in various forms that would be obvious to one of ordinary skill in the art. Further, the expansion of the pane as noted in this exemplary embodiment, that is the expansion of Pane A, differs from an expansion of a pane along the related art in which the user of the portable electronic device drags an edge of the pane to adjust the size of the pane since in the exemplary embodiment the entire pane is automatically adjusted. That is, in the conventional art it is necessary to manually adjust the size of the pane. Further, it is noted that although the description of this exemplary embodiment states that the panes are automatically resized upon the user beginning to scroll or swipe in operation 140 the scrollable list 110, this is merely an exemplary embodiment and the automatic resizing of the panes can occur at other times. For example, the panes could be automatically resized as soon as the user contacts the area 230 of the scrollable list 210 or when the user ends the scrolling/swiping motion 240 as illustrated in FIG. 2B or at other times as discussed above with respect to FIG. 1F.

Accordingly, as illustrated in FIG. 2B, Pane A moves partially off the screen 200, away from Pane B, and Pane B automatically expands to occupy the space left by Pane A. However, it is noted that this is an exemplary embodiment of the present invention, and the expansion and contraction of the Panes can be similar to the expansion and contraction discussed above with respect to FIG. 1E. This automatic expansion of Pane B provides a larger viewing area for the displayed contents or data, thus improving readability of the displayed contents, and in particular of the scrollable list 210, thus increasing the user's experience. It is noted that the pane expansion illustrated in this exemplary embodiment, particularly the expansion of Pane B, differs from conventional methods and systems in which only a clicked or selected item is magnified. That is, according to an exemplary embodiment of the present application, one of the panes is entirely expanded while the other pane is entirely contracted. However, it is noted that this is an exemplary embodiment and more than one pane can be expanded and more than one pane can be contracted according to the number of panes displayed on the screen of the portable electronic device.

Figure 2C:
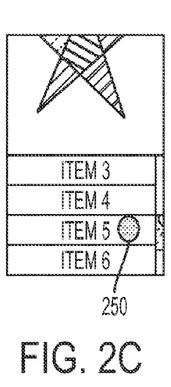
Figure 2D:
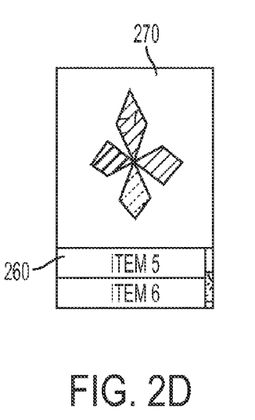

FIG. 2C illustrates a user of the electronic device selecting a particular item from the scrollable list 210, while Pane B is expanded and Pane A is contracted. In response to a user's selection 250, such as for example through a clicking motion on the selected item displayed on the scrollable list 210, the expanded Pane B automatically contracts to its original size, while Pane A automatically expands to its original size, as illustrated in FIG. 2D. Once this occurs the content displayed on one or both panes changes to reflect the last selected function. That is, as illustrated in FIG. 2C, the user selects a fifth item on the scrollable list 210 displayed on Pane B and Pane A displays content related to the selected item, i.e., the fifth item. Therefore, after the user has performed the predetermined function, Pane B returns to its original size and displays content 260 related to the last user selected function. Similarly, Pane A returns to its original size and displays content 270 related to the last selected option opted in Pane B. However, this is merely an exemplary embodiment of the present invention and the displayed contents 260 and 270 can vary. For example, if the user simply scrolled through the scrollable list 210 but did not click or select a specific item, e.g., fifth item, on the scrollable list 210, the panes could be automatically resized to their original sizes without changing the originally displayed content. In other words, panes A and B could simply display the scrollable list 210 and the contents 220.

Figure 2E:
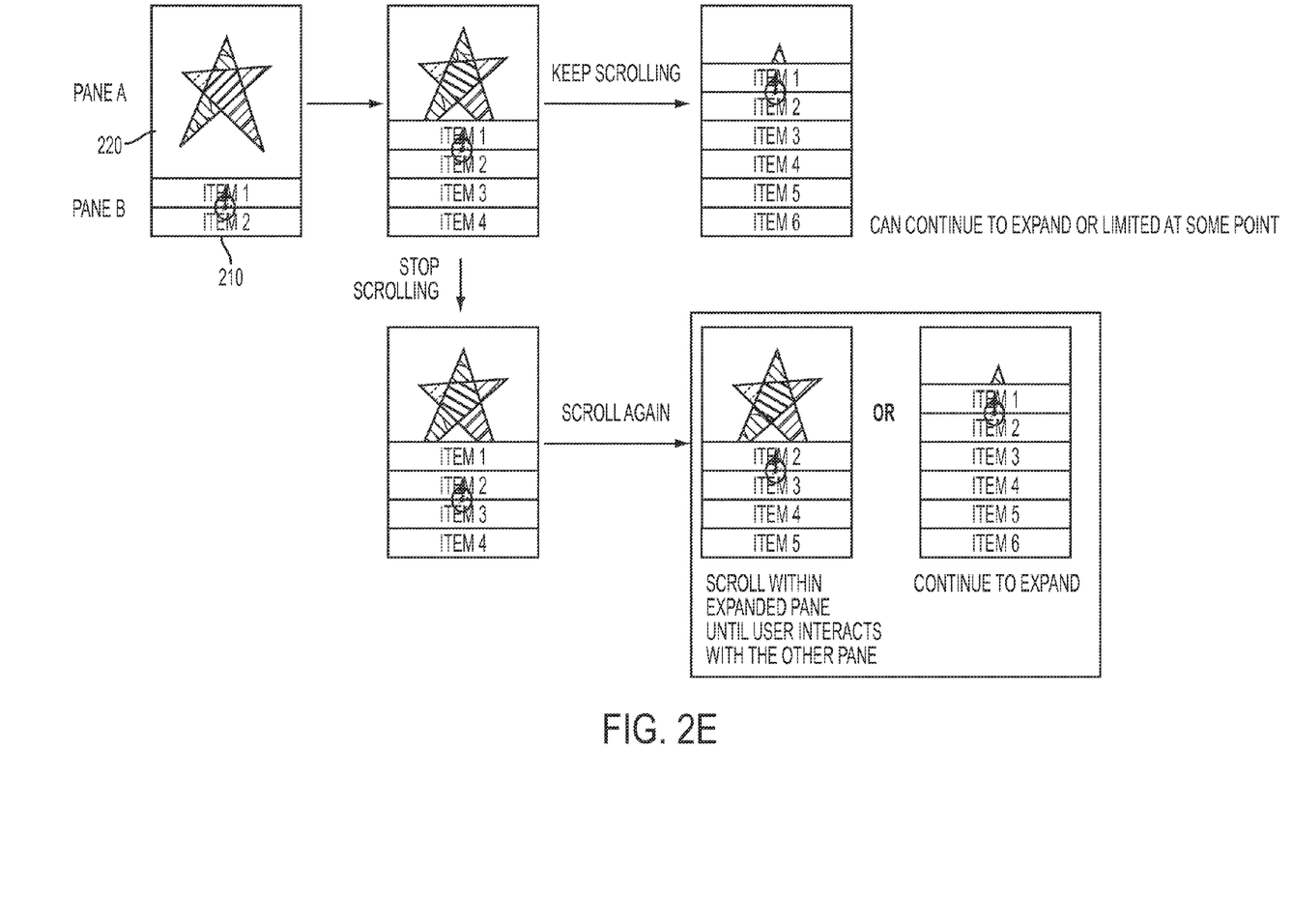
Figure 3:
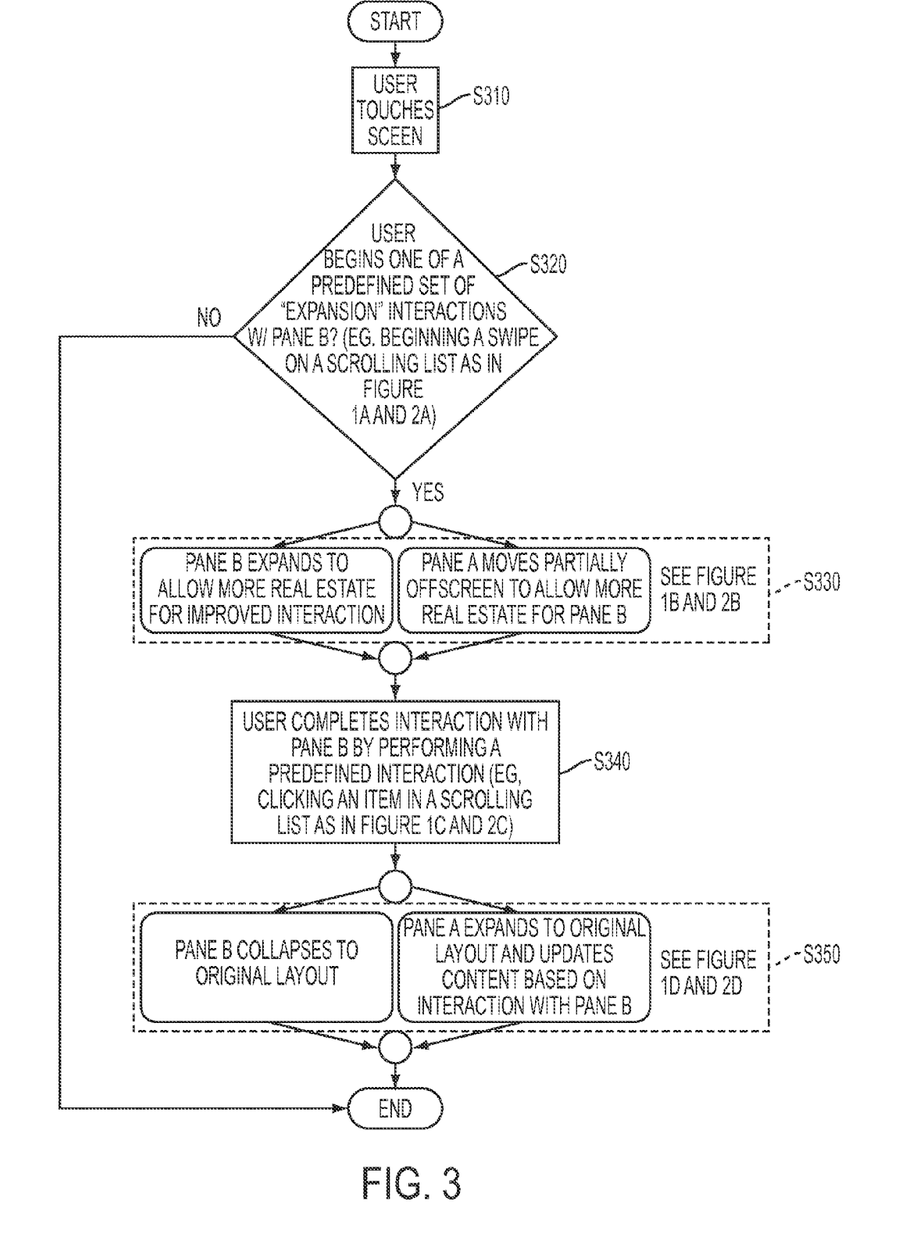
FIG. 3 is a flow diagram illustrating a method for automatically resizing panes displayed on a screen of a portable electronic device according to an exemplary embodiment of the present invention.

Further, as illustrated in FIG. 2E, the sizes of the Panes can vary according to the interaction with the panes. For example, as illustrated in FIG. 2A, the panes can have preset sizes at the beginning of the interaction. Thereafter, after the user begins to scroll through the scrollable list 210, Pane B expands while Pane A contracts. If the user of the device continues to scroll through the scrollable list 210, Pane B can continue to expand and Pane A can continue to contract. It is noted that this expansion can continue until Pane A is no longer visible or can be limited to some particular size of each of the Panes. Further, as illustrated in FIG. 2E, if the user of the device stops scrolling through the scrollable list 210, the displayed expanded and contracted Panes can be displayed at their current sizes for a preset time. If the user then continues to scroll through the scrollable list 210, the Panes can once again change in size and thus if the user continues to scroll through the scrollable list 210, Pane B can continue to expand until Pane A is no longer visible, or the expansion of Pane B and contraction of Pane A can be limited to a particular size. However, as noted above, these are merely exemplary embodiments of how the panes expand and contract as well as how the content is displayed on each of the panes, and therefore the expansion and contraction of the panes as well as the content displayed on the panes can vary FIG. 3 is a flow diagram illustrating a method for automatically resizing panes displayed on a screen of a portable electronic device according to an exemplary embodiment of the present invention.

Initially, the user of the portable electronic device touches the screen of the portable electronic device as noted at operation S310. Thereafter, the portable electronic device determines, at operation S320, whether the user's touch of one of the panes displayed on the screen of the portable electronic device is one of a resizing interaction. For example, as illustrated in FIG. 1B and in FIG. 2B, the portable electronic device determines whether the interaction is a swiping motion along the scrolling list displayed on the screen of the portable electronic device. If the portable electronic device determines, at operation S330, that the interaction is a resizing interaction, the smaller pane, such as for example Pane B illustrated in FIGS. 1A and 2B, expands to increase its viewing area, while Pane A contracts thus allowing the expansion of Pane B. It is further noted that the process of expanding and/or contracting the panes, as well as the amount of time the panes remain expand and/or contracted can vary as noted above with respect to FIGS. 1A-1F and 2A-2E. Similarly, the content displayed on the panes can also vary.

Thereafter, at operation S340, it is determined whether the user completes interacting with one of the panes. For example, if the user performs a predefined interaction on the pane, such as ending contact with the screen or clicking on the screen, as illustrated in FIGS. 1C and 2C, it is determined that the user completes interacting with the pane.

Thereafter, at operation S350, the panes are resized to their original sizes. For example, as illustrated in FIGS. 1A-1F and 2A-2E, page B contracts to its original size, whereas Pane A expands to its original size. In addition, the content displayed on both panes is updated to reflect the last interaction with the panes. Accordingly, the process of automatically resizing the panes is terminated.

Figure 4:
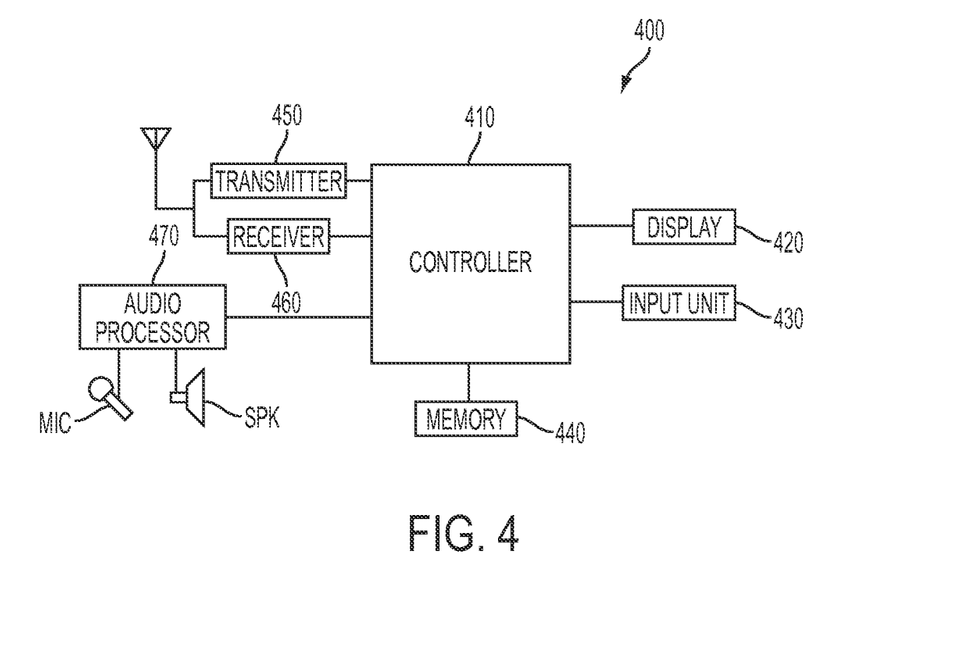
FIG. 4 is a block diagram of a portable electronic device according to an exemplary embodiment of the present invention.

FIG. 4 is a block diagram of a portable electronic device according to an exemplary embodiment of the present invention.

Referring to FIG. 4, a portable electronic device 400 according to an exemplary embodiment of the present invention includes at least one controller 410, a display 420 for displaying an active first application, and an input unit 430 for receiving inputs. In some embodiments, the display 420 and the input unit 430 may be combined as a touch-screen, although the present invention is not limited thereto.

The portable electronic device 400 may include a memory 440 for storing programs and data. The programs may include an OS and applications. If the memory 440 is present, it may include any form of memory that the at least one controller 410 can read from or write to.

The portable electronic device 400 may include a transmitter 450 and a receiver 460 for wireless communication, such as a telephone function or a wireless internet function. The portable electronic device 400 may also include an audio processor 470, a microphone MIC, and a speaker SPK, for audio communication.

The display 420 of the portable electronic device 400 may include a touch-screen display and the input unit 430 may be part of the portable electronic display 400 or separate therefrom. Additionally, the portable electronic device 400 will include a function, either readable as a program from the memory 440 or embodied as hardware in the at least one controller 410, to determine interaction with the portable electronic device 400 and to thereby automatically resize the displayed panes.

Certain aspects of the present invention may also be embodied as computer readable code on a non-transitory computer readable recording medium. A non-transitory computer readable recording medium is any data storage device that can store data, which can be thereafter read by a computer system. Examples of the non-transitory computer readable recording medium include Read-Only Memory (ROM), Random-Access Memory (RAM), Compact Disc (CD)-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for automatically resizing a plurality of dynamically sizable panes displaying information on a screen of a portable electronic device, the method comprising:
   displaying the information in the plurality of dynamically sizable panes on the screen of the portable electronic device;
   interacting with content displayed within one of the plurality of dynamically sizable panes;
   comparing the interacting with a plurality of predetermined interactions, each of the plurality of predetermined interactions specific to the one of the plurality of dynamically sizable panes;
   automatically resizing, when the interacting corresponds to scrolling the displayed content to reveal undisplayed content, the plurality of dynamically sizable panes in response to the interaction with the content of the one of the plurality of dynamically sizable panes; and
   further automatically resizing the plurality of dynamically sizable panes according to an additional interaction with the content of the one of the plurality of dynamically sizable panes, the resizing being continuous and proportional to the additional interaction,
   wherein the automatic resizing of the plurality of dynamically sizable panes in response to the scrolling of the content of the one of the plurality of dynamically sizable panes comprises increasing a size of the one of the plurality of dynamically sizable panes displaying the content and decreasing a size of all remaining dynamically sizable panes, and
   wherein the content displayed within the one of the plurality of dynamically sizeable panes that automatically increased in size corresponds to content displayed in at least one of the remaining dynamically sizable panes that automatically decreased in size.

2. The method of claim 1, wherein the interacting with the one of the plurality of dynamically sizable panes comprises contacting the screen of the portable electronic device.

3. The method of claim 1, wherein the interacting with the one of the plurality of dynamically sizable panes comprises moving an object across the one of the plurality of dynamically sizable panes.

4. The method of claim 3, wherein the object moved across the selected one of the plurality of dynamically sizable panes comprises a finger of a user of the portable electronic device.

5. The method of claim 3, wherein the object moved across the selected one of the plurality of dynamically sizable panes generates a signal indicating a contact with the screen of the portable electronic device has occurred.

6. The method of claim 1, further comprising, automatically resizing, when the additional interacting with the one of the plurality of dynamically sizable panes is terminated, the plurality of dynamically sizable panes to a size of the panes prior to the interaction.

7. The method of claim 6, wherein the additional interacting with the one of the plurality of dynamically sizable panes is terminated when a user of the portable electronic device presses and releases an object from an area of the one of the plurality of dynamically sizable panes.

8. A method for resizing a plurality of panes arranged on a screen of a portable electronic device, the method comprising:
displaying information in the plurality of panes arranged on the screen of the portable electronic device;
interacting with content displayed within one of the plurality of panes;
comparing the interacting with a plurality of predetermined interactions, each of the plurality of predetermined interactions specific to the one of the plurality of panes;
automatically resizing, when the interacting corresponds to scrolling the displayed content to reveal undisplayed content, the plurality of panes in response to the interaction with the content of the one of the plurality of panes; and
further automatically resizing the plurality of panes according to an additional interaction with the content of the one of the plurality of panes, the resizing being continuous and proportional to the additional interaction, wherein the automatic resizing of the plurality of panes in response to the scrolling of the content of the one of the plurality of panes comprises increasing a size of the one of the plurality of panes displaying the content and decreasing a size of all remaining panes, and
wherein the content displayed within the one of the plurality of panes that automatically increased in size corresponds to content displayed in at least one of the remaining panes that automatically decreased in size.

9. The method of claim 8, wherein the interacting with the one of the plurality of panes comprises swiping an object across the one of the plurality of panes.

10. The method of claim 8, further comprising automatically resizing, when the additional interacting with the one of the plurality of panes is terminated, the plurality of panes to a size of the panes prior to the interaction.

11. The method of claim 10, wherein the additional interacting with the one of the plurality of panes is terminated when a predetermined action is performed with the one of the plurality of panes.

12. The method of claim 11, wherein the predetermined action comprises a user of the portable electronic device clicking on an area of the one of the plurality of panes.

13. A method for resizing a plurality of windows arranged on a screen of a portable electronic device, the method comprising:
displaying information in the plurality of windows arranged on the screen of the portable electronic device;
interacting with content displayed within one of the plurality of windows;
comparing the interacting with a plurality of predetermined interactions, each of the plurality of predetermined interactions specific to the one of the plurality of windows;
when the interacting corresponds to scrolling the displayed content to reveal undisplayed content, automatically resizing the plurality of windows arranged on the screen of the portable electronic device in response to the interacting with the content of the one of the plurality of windows;
further automatically resizing the plurality of windows according to an additional interaction with the content of the one of the plurality of windows, the resizing being continuous and proportional to the additional interaction; terminating the additional interaction with the one of the plurality of windows; and
automatically resizing the plurality of windows arranged on the screen of the portable electronic device in response to the terminating of the additional interaction with the one of the plurality of windows,
wherein the automatic resizing of the plurality of windows arranged on the screen of the portable electronic device in response to the scrolling of the content of the one of the plurality of windows comprises expanding the one of the plurality of windows displaying the content and contracting remaining ones of the plurality of windows, and
wherein the content displayed within the one of the plurality of windows that automatically expanded corresponds to content displayed in at least one of the remaining plurality of windows that automatically contracted.

14. The method of claim 13, wherein the interacting with the one of the plurality of windows comprises at least one of a swiping action and a clicking action on the one of the plurality of windows.

15. The method of claim 13, wherein the terminating of the interaction with the one of the plurality of windows comprises performing a predetermined action on the one of the plurality of windows.

16. The method of claim 15, wherein the predetermined action on the one of the plurality of windows comprises a clicking action.

17. The method of claim 13, wherein the automatic resizing of the plurality of windows arranged on the screen of the portable electronic device in response to the terminating of the additional interaction with the one of the plurality of windows comprises contracting the one of the plurality of windows and expanding remaining ones of the plurality of windows.

18. A portable electronic device comprising:
a touchscreen including a display and an input; and
at least one processor configured to control the touchscreen to:
display information in a plurality of dynamically sizable panes,
based on input to the touchscreen, detect an interaction with content displayed within one of the plurality of dynamically sizable panes,
compare the interaction with a plurality of predetermined interactions, each of the plurality of predetermined interactions specific to the one of the plurality of dynamically sizable panes,
automatically resize, when the interacting corresponds to scrolling the displayed content to reveal undisplayed content, the plurality of dynamically sizable panes in response to the detection of the interaction with the content of the one of the plurality of dynamically sizable panes, and
further automatically resize the plurality of dynamically sizable panes according to an additional interaction with the content of the one of the plurality of dynamically sizable panes, the resizing being continuous and proportional to the additional interaction, wherein the at least one processor is further configured to:

increase, when automatically resizing of the plurality of dynamically sizable panes in response to the detection of the scrolling of the content of the one of the plurality of dynamically sizable panes, a size of the one of the plurality of dynamically sizable panes displaying the content, and decrease a size of remaining plurality of dynamically sizable panes, and wherein the content displayed within the one of the plurality of dynamically sizeable panes that automatically increased in size corresponds to content displayed in at least one of the remaining plurality of dynamically sizable panes that automatically decreased in size.

19. The portable electronic device of claim 18, wherein the interaction with the one of the plurality of dynamically sizable panes is based on a contact on the touchscreen.

20. The portable electronic device of claim 18, wherein the interaction with the one of the plurality of dynamically sizable panes comprises moving an object across the selected one of the plurality of dynamically sizable panes.

21. The portable electronic device of claim 20, wherein a finger of a user of the portable electronic device is moved across the selected one of the plurality of dynamically sizable panes.

22. The portable electronic device of claim 20, wherein, when the object is moved across the selected one of the plurality of dynamically sizable panes, the touchscreen generates a signal indicating that a contact on the touchscreen has occurred.

23. The portable electronic device of claim 18, wherein the at least one processor is further configured to, when the additional interaction with the one of the plurality of dynamically sizable panes is terminated, automatically resize the plurality of dynamically sizable panes to a size of the panes prior to the interaction.

24. The portable electronic device of claim 23, wherein the interaction with the one of the plurality of dynamically sizable panes is terminated when a user of the portable electronic device ends contact with an area of the one of the plurality of dynamically sizable panes.

25. A portable electronic device comprising:

a touchscreen including a display and an input unit; and
at least one processor configured to control the touchscreen to:
display information in a plurality of panes,
based on input to the touchscreen, detect an interaction with content displayed within the one of the plurality of panes,
compare the interaction with a plurality of predetermined interactions, each of the plurality of predetermined interactions specific to the one of the plurality of panes,
automatically resize, when the interacting corresponds to scrolling the displayed content to reveal undisplayed content, the plurality of panes in response to the detection of the interaction with the content of the one of the plurality of panes, and
further automatically resize the plurality of panes according to an additional interaction with the content of the one of the plurality of panes, the resizing being continuous and proportional to the additional interaction, wherein the automatic resizing of the plurality of panes in response to the detection of the scrolling of the content of the one of the plurality of panes comprises increasing a size of the one of the plurality of panes displaying content and decreasing a size of remaining panes, and wherein the content displayed within the one of the plurality panes that automatically increased in size corresponds to content displayed in at least one of the remaining panes that automatically decreased in size.

26. The portable electronic device of claim 25, wherein the interaction with the one of the plurality of panes comprises moving an object across the one of the plurality of panes.

27. The portable electronic device of claim 25, wherein, the at least one processor is further configured to, when the additional interaction with the one of the plurality of panes is terminated, automatically resize the plurality of panes to a size of the panes prior to the interaction.

28. The portable electronic device of claim 27, wherein the interaction with the one of the plurality of panes is terminated when a predetermined action is performed with the one of the plurality of panes or when a predetermined action is performed with the remaining panes.

29. The portable electronic device of claim 28, wherein the predetermined action comprises a user of the portable electronic device clicking on an area of the one of the plurality of panes or clicking on an area of the remaining panes.

30. A portable electronic device comprising:

a touchscreen including a display and an input unit; and
at least one processor configured to control the touchscreen to:
display information in a plurality of windows, based on input to the touchscreen,
detect an interaction with content displayed within one of the plurality of windows,
compare the interaction with a plurality of predetermined interactions, each of the plurality of predetermined interactions specific to the one of the plurality of windows,
automatically resize, when the interacting corresponds to scrolling the displayed content to reveal undisplayed content, the plurality of windows in response to the detection of the interaction with the content of the one of the plurality of windows,
further automatically resize the plurality of windows according to an additional interaction with the content of the one of the plurality of windows, the resizing being continuous and proportional to the additional interaction,
detect termination of the additional interaction with the one of the plurality of windows, and
automatically resize the plurality of windows in response to the detected termination of the interaction with the one of the plurality of windows, wherein the automatic resizing of the plurality of windows in response to the detection of the scrolling of the content of the one of the plurality of windows comprises expanding the one of the plurality of windows displaying the content and contracting remaining ones of the plurality of windows, and wherein the content displayed within the one of the plurality of windows that automatically expanded corresponds to content displayed in at least one of the remaining windows that automatically contracted.

31. The portable electronic device of claim 30, wherein the interaction with the one of the plurality of windows comprises at least one of a swiping action and a clicking action on the one of the plurality of windows.

32. The portable electronic device of claim 30, wherein the termination of the interaction with the one of the plurality of windows is detected when a predetermined action is performed on the one of the plurality of windows.

33. The portable electronic device of claim 32, wherein the predetermined action on the one of the plurality of windows comprises a clicking action.

34. The portable electronic device of claim 30, wherein the automatic resizing of the plurality of windows in response to the detection of the termination of the additional interaction with the one of the plurality of windows comprises contracting the one of the plurality of windows and expanding remaining ones of the plurality of windows.

\* \* \* \* \*